(12) United States Patent
Chishima et al.

(10) Patent No.: US 8,854,227 B2
(45) Date of Patent: Oct. 7, 2014

(54) CONTAINER AND INFORMATION PROVISION SYSTEM

(75) Inventors: Makoto Chishima, Kanagawa (JP); Kugo Morita, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 1357 days.

(21) Appl. No.: 12/622,822

(22) Filed: Nov. 20, 2009

(65) Prior Publication Data

US 2010/0066556 A1 Mar. 18, 2010

Related U.S. Application Data

(62) Division of application No. 11/259,627, filed on Oct. 25, 2005, now Pat. No. 7,663,497.

(30) Foreign Application Priority Data

Oct. 25, 2004 (JP) .................................. 2004-309518
Oct. 26, 2004 (JP) .................................. 2004-311294

(51) Int. Cl.
G08B 21/00 (2006.01)
G01F 23/284 (2006.01)
G01G 17/04 (2006.01)

(52) U.S. Cl.
CPC ............ *G01F 23/2845* (2013.01); *G01G 17/04* (2013.01); *G01F 23/284* (2013.01); *B65D 2203/10* (2013.01)
USPC ........... 340/686.1; 340/686.6; 455/7; 455/16; 455/523

(58) Field of Classification Search
USPC ............................... 340/686.1; 455/7, 16, 523
See application file for complete search history.

(56) References Cited

U.S. PATENT DOCUMENTS

| 4,462,261 | A | 7/1984 | Keyes et al. |
| 5,014,798 | A | 5/1991 | Glynn |
| 6,032,020 | A * | 2/2000 | Cook et al. ........................ 455/7 |
| 2,241,064 | A1 | 5/2001 | Harbison |
| 6,751,730 | B1 | 6/2004 | Walker et al. |
| 7,366,675 | B1 | 4/2008 | Walker et al. |
| 2004/0124988 | A1 | 7/2004 | Leonard et al. |

FOREIGN PATENT DOCUMENTS

| DE | 94 17 632 | 2/1995 |
| JP | 06123781 | 5/1994 |
| JP | 08313326 | 11/1996 |
| JP | 2000172811 A | 6/2000 |
| JP | 2000-310554 | 11/2000 |
| JP | 2001-317856 | 11/2001 |
| JP | 2003185326 A | 7/2003 |
| JP | 2003-227676 | 8/2003 |
| JP | 2003276809 A | 10/2003 |
| JP | 2003-325074 | 11/2003 |
| WO | 2004-049237 | 6/2004 |

OTHER PUBLICATIONS

Japanese language office action dated Mar. 23, 2003 and its English language translation for corresponding Japanese application 2004309518.

* cited by examiner

*Primary Examiner* — Daryl Pope
(74) *Attorney, Agent, or Firm* — DLA Piper LLP (US)

(57) ABSTRACT

One of the embodiment of present invention includes at least one transmitter-receiver set including a transmitter and a receiver opposed with an object to be measured therebetween; and a transmission device that estimates the amount of the object based on the attenuation of electromagnetic waves that are transferred between the transmitter and the receiver of the transmitter-receiver set, and transmits information on the estimated amount of the object to be measured.

4 Claims, 7 Drawing Sheets

: LIQUID

FIG. 11

CONTAINER AND INFORMATION PROVISION SYSTEM

CROSS-REFERENCE TO RELATED APPLICATIONS

This application is a divisional of application Ser. No. 11/259,627, filed on Oct. 25, 2005, and claims the benefit of priority under 35 USC 119 of Japanese application no. 2004-309518, filed on Oct. 25, 2004, and Japanese application no. 2004-311294, filed on Oct. 26, 2004, which are incorporated herein by reference.

BACKGROUND OF THE INVENTION

1. Field of the Invention

The present invention relates to a container for use in preserving food or the like and to an information provision system that transmits information on the amount or presence of beverage or food.

2. Description of the Related Art

A radio frequency identification (RFID) tag has received attention to manage food or the like. Specifically speaking, different RFID tags in which the kind of food and so on are recorded are attached to individual foods, so that the information recorded in the RFID tags is read and used to manage the number or kind of foods in a storage such as a refrigerator.

For example, an egg-information management system for managing information specific to eggs in packages is disclosed in JP-A-2003-325074. The IC tags of the system have information on the expiration date etc. of eggs, which can be used at home or the like.

Another technique of inventory control for food whose storage space is fixed is disclosed in JP-A-2001-317856, which proposes a refrigerator in which food information such as the name and the threshold of remaining amount of food is input only once before the start of inventory control, from which the remaining amount can be determined.

However, ordinary home consumers buy meat etc. in a mass, and take out part of them every cooking, or store it after precooking and take out a necessary amount for cooking. For this purpose, Tapperware™ or the like is used.

When food is transferred from a package at the time of purchase to Tapperware™ or the like, the information in the RFID tag attached to the package at the time of purchase cannot be used. Accordingly, containers for transfer may incorporate a device for storing and displaying information, to which information is entered from a keyboard or the like. However, it takes much time and labor to input the information on large amount of food, so that it is inconvenient.

For food that is taken out by a necessary amount to cook, the food in the transfer container can be managed only by appearance or the like. This may not provide sufficient information control, in the future of advanced computerization of home appliance, so that it is inconvenient.

For the related-art refrigerator, the inventory control is allowed only for solid food, such as eggs, whose position fixed. However, the remaining amount of beverage cannot be managed. Also, this is not adaptable to actual food storage, such as when sealed bottles are laid on their sides or food other than eggs (e.g., tube wasabi) is placed in the space for eggs, the remaining amount cannot be determined accurately, resulting in limited availability.

SUMMARY OF THE INVENTION

The invention is made in view of the above-described problems. Accordingly, it is an object of the invention to provide a container and an information provision system capable of improving convenience and increasing availability.

The invention is a container including a container main body and a lid corresponding to the container main body. The container determines the amount of an object held in the container; stores information on the determined amount of the object; detects whether or not the container main body is sealed by the lid; determines the amount of the object contained in the container main body at the time when the container is brought from the state in which the container main body is not sealed by the lid into the state in which the container main body is sealed by the lid; and stores the information on the determined amount of the object.

DESCRIPTION OF THE PREFERRED EMBODIMENT

Figure 1:
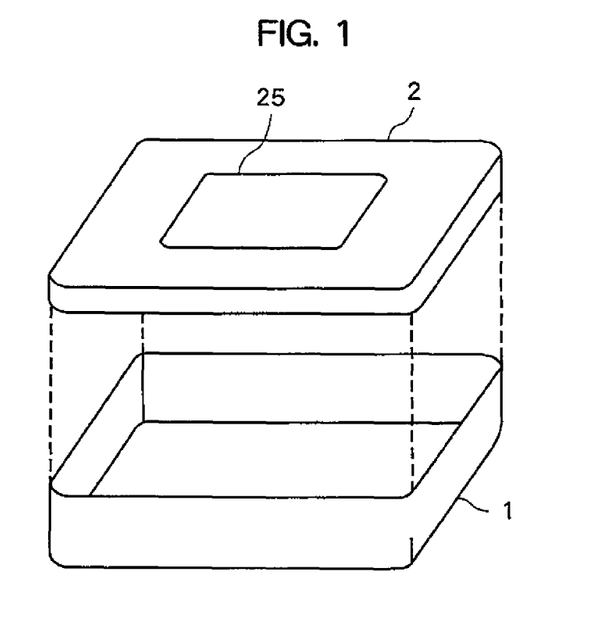
FIG. 1 is a schematic explanatory diagram of a container according to an embodiment of the invention.
Figure 2:
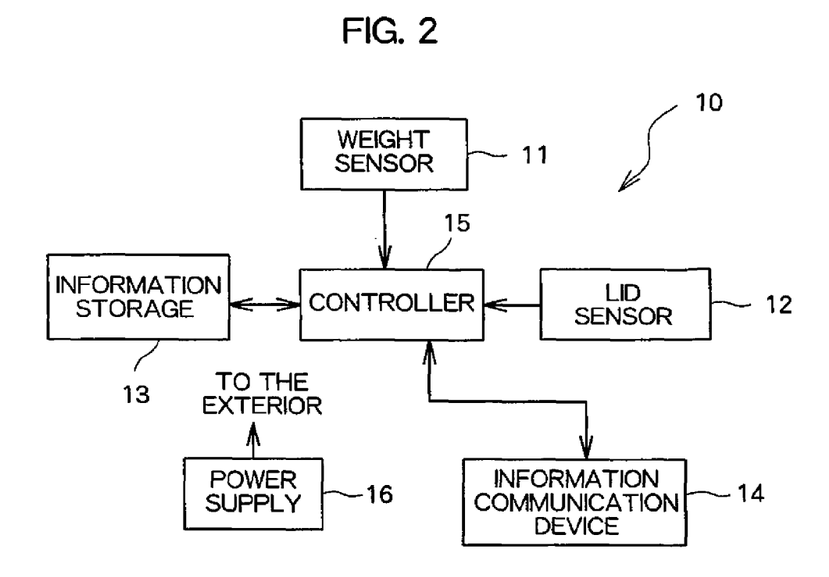
FIG. 2 is a block diagram of a container main body according to the embodiment.
Figure 3:
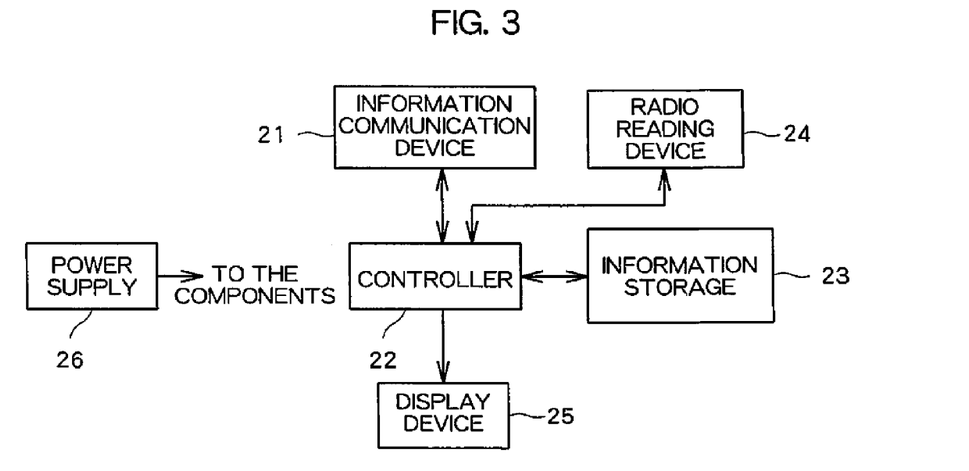
FIG. 3 is a block diagram of a lid according to the embodiment.

A container according to an embodiment of the invention will be described with reference to the drawings. As shown in FIG. 1, the container includes a container main body 1 and a lid 2 corresponding thereto. As shown in FIG. 2, the container main body 1 has a built-in main body unit 10 including a weight sensor 11 serving as a content-amount determination device; a lid sensor 12; an information storage 13; an information communication device 14; a controller 15; and a power supply 16. As shown in FIG. 3, the lid 2 includes an information communication device 21; a controller 22; an information storage 23; a radio reading device 24; a display device 25: and a power supply 26.

As shown in FIG. 2, the weight sensor 11 may be a known sensor such as a what-is-called load-cell sensor using a strain generator and a strain gauge. The output of the weight sensor 11 is converted from analog to digital form, and is output to the controller 15 as content-amount information.

The lid sensor 12 determines whether or not the container main body 1 is sealed by the lid 2. For example, the lid 2 has a permanent magnet, while the container main body 1 has a hall element (electric-field sensor) serving as the lid sensor 12 at the part corresponding to the permanent magnet. Thus, when the container main body 1 is covered with the lid 2, an electric field can be detected. While the electric field is detected, the controller 15 determines that the container main body 1 is sealed by the lid 2 according to the detection signal from the lid sensor 12. The lid sensor 12 may be a switch that is turned on when the package main body 1 is sealed by the lid 2 and turned off when the lid 2 is taken off.

The information storage 13 can be a memory element such as a static random access memory (SRAM). The information storage 13 stores information according to an instruction input from the controller 15. When a read request is given from the controller 15, the information storage 13 outputs the contents of the stored information to the controller 15.

The information communication device 14 transmits information by radio according to the instruction from the controller 15. The information communication device 14 receives the radio signal, and outputs information obtained by decoding the signal to the controller 15.

The controller 15 is, e.g., a CPU, which is operated according to a program stored in a program memory (not shown). The controller 15 executes the process of storing the content-amount information output from the weight sensor 11 at a specified timing in the information storage 13 and the process of transmitting the content-amount information via the information communication device 14. The details of the process of the controller 15 will be specifically described hereinafter.

The power supply 16 supplies power to the components of the container main body 1. For example, the power supply 16 includes a charge and discharge secondary cell and a battery charger. The battery charger receives external electricity by electromagnetic coupling and charges the secondary cell.

As shown in FIG. 3, the information communication device 21 of the lid 2 communicates by radio with the information communication device 14 of the container main body 1. The information communication device 21 transmits information by radio according to the instruction input from the controller 22. The information communication device 21 receives a radio signal, and outputs information obtained by decoding the signal to the controller 22.

The controller 22 is, e.g., a CPU, which is operated according to a program stored in a program memory (not shown). For example, the controller 22 executes the process of storing the information received by the information communication device 21 in the information storage 23 and the process of displaying the information on the display device 25. The controller 22 also executes the process of storing information read by the radio reading device 24 into the information storage 23, and displaying it on the display device 25. The details of the process of the controller 22 will be specifically described hereinafter.

The information storage 23 can be a memory element such as a SRAM (Static Random Access. Memory). The information storage 23 stores information according to an instruction input from the controller 22. When a read request is given from the controller 22, the information storage 23 outputs the content of the stored information to the controller 22.

The radio reading device 24 receives a signal from a radio-signal transmitter such as RFID tags, and outputs information obtained by decoding the signal to the controller 22. The display device 25 is a liquid crystal display or the like. The display device 25 displays information according to the instruction input from the controller 22.

The power supply 26 supplies power to the components of the lid 2. For example, the power supply 26 includes a charge and discharge secondary cell and a battery charger. The battery charger receives external electricity by electromagnetic coupling, and charges the secondary cell.

The operation of the controller 15 of the container main body 1 will be described. In this embodiment, the controller 15 detects the fact that the container is brought from the state in which the container main body 1 is not sealed by the lid 2 into the state in which the container main body 1 is sealed by the lid 2. At the time the fact is detected, the controller 15 obtains the content-amount information output from the weight sensor 11. In other words, the amount of food held in the container main body 1 may change only after the lid 2 is removed and the contents are taken out. Accordingly, the measurement at the time when the lid 2 is opened and then closed increases the efficiency of the process and enhances power saving. The controller 15 stores the obtained content-amount information in the information storage 13. The controller 15 transmits the obtained content-amount information to the lid 2 via the information communication device 14.

The controller 22 of the lid 2 stores information received by the information communication device 21 in the information storage 23. For example, the information received by the information communication device 21 is the content-amount information transmitted from the container main body 1. Briefly, the controller 22 receives the content-amount information measured by the container main body 1 and stores it in the information storage 23. The controller 22 also stores information read by the radio reading device 24 in the information storage 23. The information read by the radio reading device 24 is information received from an RFID tag affixed to the package or the like of food, including the kind of food (a specific food name such as "ground beef"), expiration date, use-by date, the place of production, the method of process, etc.

Figure 4:
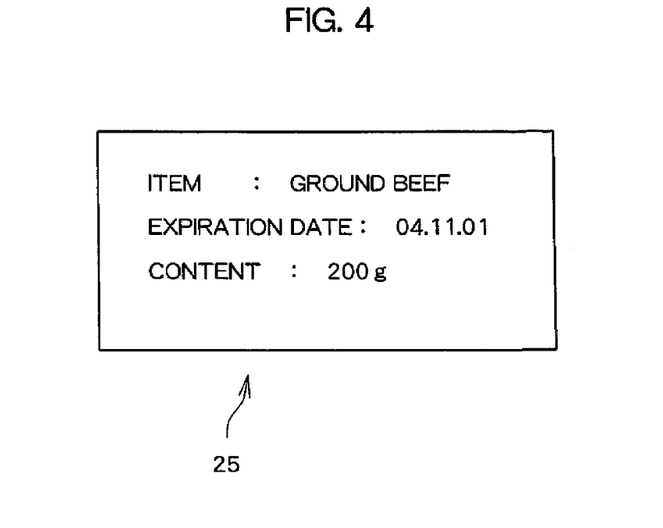
FIG. 4 is an explanatory diagram of a display example of the information of the container according to the embodiment.

The controller 22 outputs the information stored in the information storage 23 onto the display device 25. Thus, the display device 25 displays the information on the kind and expiration date of the food and the content-amount information determined by the container main body 1 as shown in FIG. 4.

[Operational Example of the Container]

The operation of the container according to the embodiment will be described. Assume that an RFID tag that stores information on the kind and expiration date of purchased food is attached to the package of the food.

The user of the container brings the lid 2 close to the package of the purchased food. Then the radio reading device 24 of the lid 2 receives the information on the kind and expiration date of the food from the RFID tag affixed to the package of the food. The information is output to the controller 22. The controller 22 stores the information in the information storage 23.

The user puts the food in the package into the container main body 1 with the lid 2 open (with the container main body 1 not covered by the lid 2), and seals the container main body 1 with the lid 2. Then, the lid sensor 12 detects that the container main body 1 is sealed by the lid 2, and the controller 15 obtains the content-amount information from the output of the weight sensor 11 at this timing. Here, the content-amount information is the weight of the stored food.

The controller 15 stores the content-amount information in the information storage 13, and transmits the content-amount information to the lid 2 via the information communication device 14. The controller 22 of the lid 2 receives the content-amount information via the information communication device 21, and stores it in the information storage 23. The controller 22 outputs the information stored in the information storage 23 to the display device 25 (FIG. 4).

Thereafter, when the user opens the lid 2 to use part of the stored food and taken out the contents, the container operates as follows:

When the user takes out part of the contents and then closes the lid 2 (seals the container main body 1 with the lid 2), the lid sensor 12 detects that the container main body 1 is sealed by the lid 2, at which the controller 15 obtains content-amount information using the weight sensor 11. The content-amount information obtained here comes to a value decreased by an amount used from the previous measurement because part was used. The controller 15 overwrites the content-amount information and stores it in the information storage 13, and transmits the content-amount information to the lid 2 via the information communication device 14.

Although the controller 15 overwrites the content-amount information obtained from the weight sensor 11 and stores it in the information storage 13, it may be as follows: (1) when the information storage 13 has content-amount information "0" (e.g., weight: 0 g), and content-amount information indicative of that the contents are W g (W>0) in weight is given from the weight sensor 11, the controller 15 determines that new contents are stored, and stores the obtained content-amount information in the information storage 13; (2) when the information storage 13 stores content-amount information W' (W'>0), and content-amount information indicative of that the contents are W g (W>0, W≠W') in weight is given from the weight sensor 11, the controller 15 determines that the contents were used or added, and overwrites the obtained content-amount information in the information storage 13; (3) when the information storage 13 stores content-amount information "0" (e.g., weight: 0 g), and content-amount information indicative of that the contents are W gram, smaller than a specified threshold ω (ω>W≥0) in weight is given from the weight sensor 11, the controller 15 determines that the contents were used to the fullest, so that it stores no content-amount information in the information storage 13. In the case where it is determined that the contents were used to the fullest, the controller 15 may transmit the information indicative of that the contents were used to the fullest (e.g., content-amount information "0") to the lid 2 via the information communication device 14.

The controller 22 of the lid 2 receives the content-amount information via the information communication device 21, and stores it in the information storage 23. The controller 22 then displays the information stored in the information storage 23 on the display device 25. Of the information displayed, the kind and expiration date of the food remain unchanged, but only the information on the amount of food used is updated. In the container of the embodiment, when an RFID tag is affixed to the package of food, the information on the food can be input by bringing the lid 2 close to the RFID tag that stores the information, so that also the content-amount information can be displayed.

[Modification of Information Input]

The radio reading device 24 of the lid 2 may receive a signal from a radio-signal transmitter such as an RFID tag when the lid 2 is separated from the container main body 1 (the container main body 1 is not sealed). For this purpose, the lid 2 may include a switch or sensor that detects that the container main body 1 is sealed, like the lid sensor 12 of the container main body 1, so that the separation of the lid 2 from the container main body 1 can be detected according to the output of the switch or sensor.

With such a structure, the information in the RFID tag can be read only when the lid 2 is removed and brought close to the RFID tag. This prevents misreading of the information when a package having an RFID tag comes close with the container main body 1 being closed.

[Erasing Information]

The controller 15 of the container main body 1 and the controller 22 of the lid 2 execute the process of erasing the information stored in the information storage 13 and the information storage 23, respectively. For example, when the content-amount information (weight information) output from the weight sensor 11 reaches smaller than a predetermined threshold, the controller 15 determines that stored food was used up, and erases the information stored in the information storage 13. Then the controller 15 transmits information indicative of content-amount information "0 in weight" to the lid 2.

When the controller 22 of the lid 2 receives the content-amount information indicative of that the contents were used up ("0 in weight"), it determines that the contents were used to the fullest, and erases the information stored in the information storage 23.

The contents of the information storage 13 or 23 may be erased when the container is placed upside down for a predetermined time in the state in which the lid 2 and the container main body 1 are separated from each other for cleaning and drying. In this case, the controller 15 of the container main body 1 detects that the lid 2 and the container main body 1 are separated from each other (not sealed) by the lid sensor 12 or the like. Alternatively, it detects that the container is place upside down by an angle sensor or the like using the flow of fluid or the rotation of a metallic ball.

The controller 15 measures the time while the container is placed upside down by a timer (not shown), wherein when the time exceeds a predetermined time, it determines that the container has been cleaned and dried, so that the contents have been used up, and erases the information stored in the information storage 13. In this case, the controller 15 transmits content-amount information indicative of that the contents were used up (e.g., content-amount information indicative of that the content is "0") to the lid 2 when the package main body 1 is sealed by the lid 2. The controller 22 of the lid 2 receives that the information indicative of that the contents were used up, and erases the contents of the information storage 23.

Alternatively, when the radio reading device 24 of the lid 2 receives a signal of instruction to erase information using the RFID tag that radiates a signal (a predetermined signal) of instruction to erase the information, the controller 22 may erase the contents of the information storage 23, and transmit an erase instruction, to erase the information to the container main body 1 via the information communication devices 14 and 21. In this case, when the controller 15 of the container main body 1 receives the erase instruction, it erases the contents of the information storage 13.

[Another Example of Content-Amount Information]

While an embodiment has been described for the case in which the content-amount information is weight by way of example, the content-amount information may be the number of contents accommodated. The number of the contents can be determined by counting the number of RFID tags when the individual goods have RFID tags.

It is also possible that the container main body 1 is partitioned into N spaces by partitions or the like, for which different weight sensors 11 may be disposed. In this case, when one item is put into, each space, the number of the contents can be determined from the number of the weight sensors 11 that detect a weight larger than a predetermined threshold.

When the multiple spaces are formed, in each of which the weight sensor 11 is disposed, the controller 15 may obtain the information on the weight of the content in each space. In this case, the content-amount information on the whole contents in the container main body 1 may be determined by calculating the sum of the weight information. When the contents are packed in the container main body 1 with its detachable partitions removed, the sum information can be used.

[Another Example of Provision of Information]

While an embodiment has been described for the case in which the lid 2 has the display device 25, on which the controller 22 displays information, it is also possible to provide a display device to the container main body 1, allow the controller 15 to receive the information on the kind of the stored contents via the information communication devices 14 and 21, and allow the display device to display the contents as in FIG. 4.

It is also possible to allow at least one of the information communication device 14 of the container main body 1, and the information communication device 21 of the lid 2 to communicate with a home appliance or a modem in the neighborhood (in the range from a few meters to at most 100 meters) to output the information on the kind and amount of contents to the home appliance (e.g., a refrigerator).

It is also possible to communicate via a network or a mobile phone network to output the information on the kind and amount of contents to a mobile phone.

According to another aspect of the embodiment, an information provision system is provided which measures the remaining amount of an object. Here, the object to be measured varies (e.g., decreases) in amount as it is used, such as beverage or food remaining in a container or a bottle. The object to be measured will be described herein with beverage or food as an example.

Figure 5:
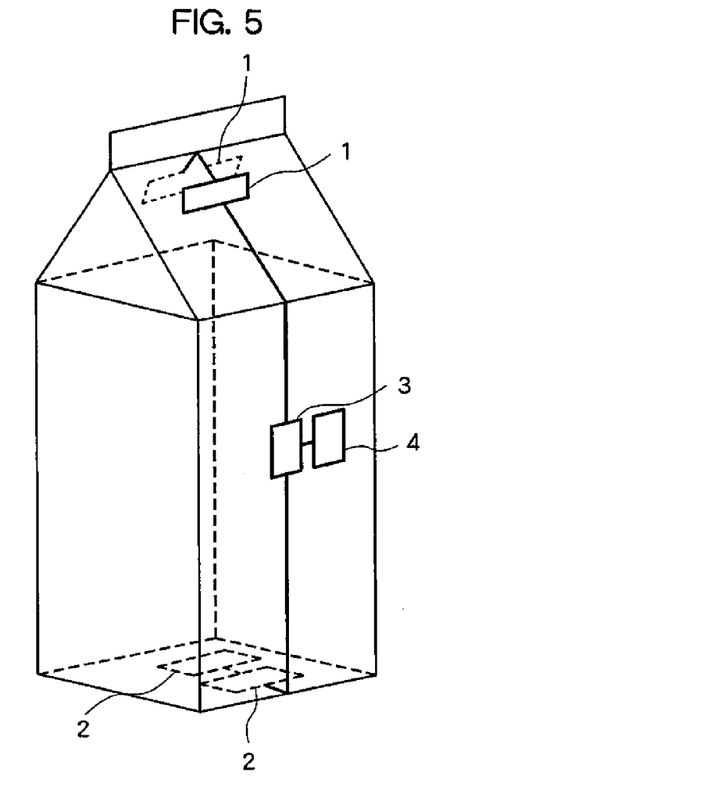
FIG. 5 is an explanatory diagram of an example of the structure and arrangement of an information provision system according to an aspect of the embodiment.

FIG. 5 is a diagram of an example in which the information provision system is affixed to a package serving as a storage container. Since the package such as shown in FIG. 5 cannot be tightly sealed in principal, it is not laid on its side after being opened. For such a package that cannot be laid on its side, at least a set of a transmitter 1 and a receiver 2 is disposed at the upper part and on the bottom, respectively. Accordingly, the transmitter 1 and the receiver 2 are opposed with object beverage therebetween.

Figure 6:
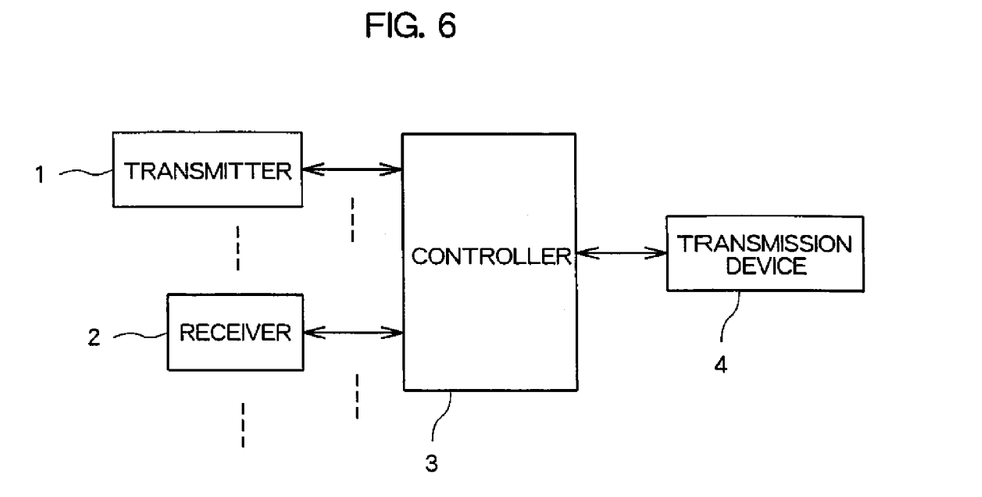
FIG. 6 is a block diagram of a structural example of the information provision system according to an aspect of the embodiment.

As shown in FIG. 6, the information provision system includes a controller 3 and a transmission device 4 connected to the transmitter 1 and the receiver 2. Upon receiving an external measurement-instruction signal, the controller 3 radiates electromagnetic waves (radio waves) with a specified frequency from the transmitter 1 to the receiver 2. The frequency of the electromagnetic waves is set in a frequency band in which, e.g., water attenuation is relatively high, specifically, at a frequency of about 2.4 GHz for use in microwave ovens and so on.

The controller 3 can be a microcomputer including a built-in memory device. The controller 3 measures the signal intensity of the electromagnetic waves received by the receiver 2. The controller 3 stores a signal intensity MAX when there is no beverage and a signal intensity MIN in an unopened state.

Figure 7:
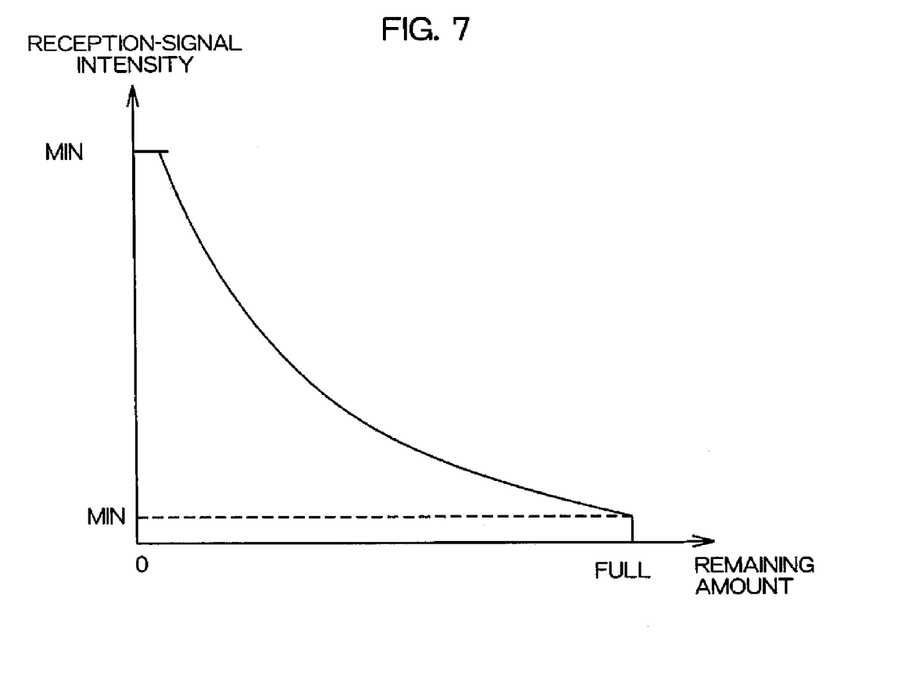
FIG. 7 is a graph showing an example of the relationship between the amount of content and the signal intensity of the information provision system according to an aspect of the embodiment.

Since the electromagnetic waves received are absorbed by the moisture interposed between the transmitter 1 and the receiver 2 to attenuate, the signal intensity increases as the beverage decreases, as shown in FIG. 7. The controller 3 estimates the remaining amount depending on the degree of the measured signal intensity relative to the value MAX when the container is empty and the value MIN when the container is full, generates information indicative of the estimated remaining amount (remaining-amount information), and outputs it to the transmission device 4. The transmission device 4 is, e.g., an RFID tag, which modulates the signal input from the controller 3 to a signal, and transmits the signal.

Figure 8:
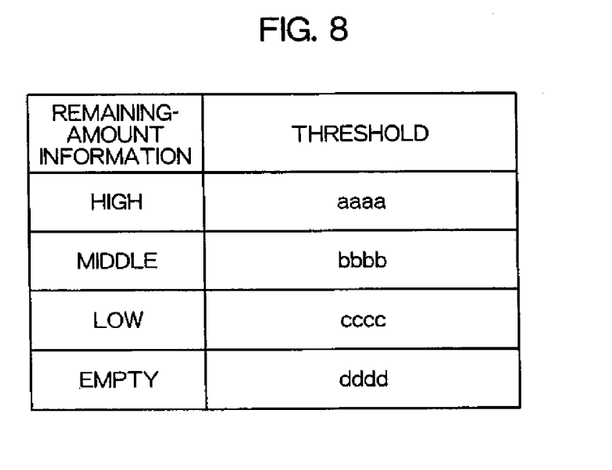
FIG. 8 is an explanatory diagram of an example of the threshold information of the information provision system according to an aspect of the embodiment.

The remaining-amount information generated by the controller 3 may information indicative of the degree of the remaining amount, such as four degrees of "high", "middle", "low" and "empty". In this case, the controller 3 stores information on thresholds that is determined for each beverage type in advance, as shown in FIG. 8. When the measured signal intensity is, e.g., larger than the threshold for the degree "middle" and smaller than the threshold for the degree "high", The controller 3 outputs information indicative of the degree "middle".

Figure 9:
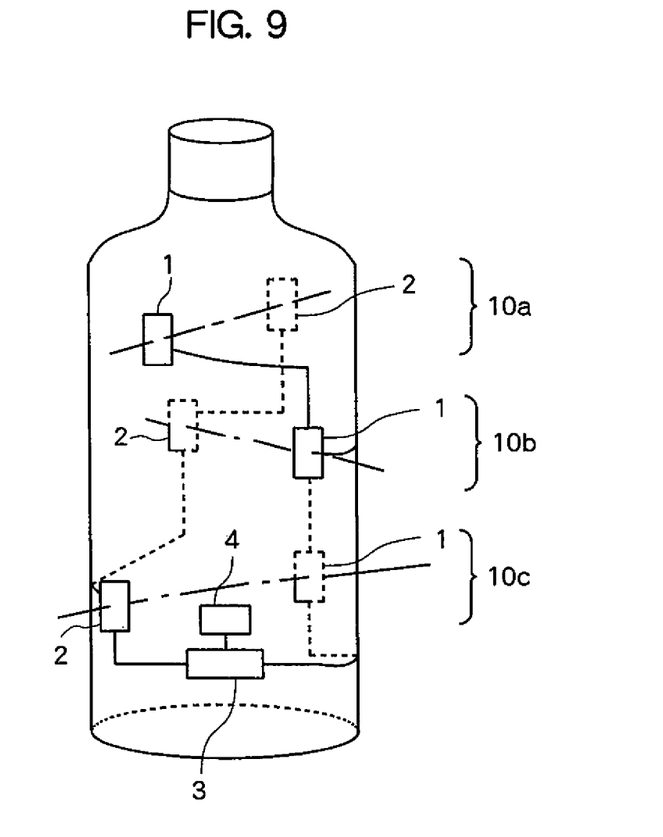
FIG. 9 is an explanatory diagram of another example of the structure and arrangement of the information provision system according to an aspect of the embodiment.

FIG. 9 shows an example in which the information provision system of the embodiment is affixed to a container such as a PET bottle. Since this can be laid on its side, the result of measurement can be incorrect when the transmitter 1 and the receiver 2 are simply disposed at the upper part and on the bottom, respectively. Accordingly, for such a tightly sealable container (that may be laid horizontally), a plurality of sets (transmitter-receiver sets) of the transmitter 1 and the receiver 2, 10a, 10b and so on, are disposed at intervals along the height when it is placed vertically. FIG. 9 shows a state in which three sets 10a, 10b, and 10c are disposed at the height of one quarter, one half, and three quarters from the bottom to the liquid level in an unopened state, respectively.

The transmitter 1 and the receiver 2 of each set 10 are opposed to each other. The sets 10 are disposed as follows: assumes the line (a first line) connecting the transmitter 1 and the receiver 2 of a first set 10a, and the line (a second line) connecting the transmitter 1 and the receiver 2 of a second set 10b. The transmitter-receiver sets are disposed such that the first line and the second line cross each other. FIG. 9 shows an example in which a set 10 is disposed such that it is twisted 60 degrees relative to the next set 10.

With such a structure, the reception-signal intensity of each set 10 comes to the value MIN for an unopened state when the container is placed vertically and the beverage is not consumed. The signal intensity varies to the value MAX for an empty state in the order from the upper set 10a. For example, when about one third of beverage is consumed, smaller than two thirds (smaller than three quarters) of beverage remains, which is more than one half. Accordingly, the reception-signal intensity of the uppermost set 10a comes to the value MAX, and the reception-signal intensity of the set 10b at the height of one half of that in a full state and the set 10c at the height of one quarter remain at the value MIN.

Figure 10A:
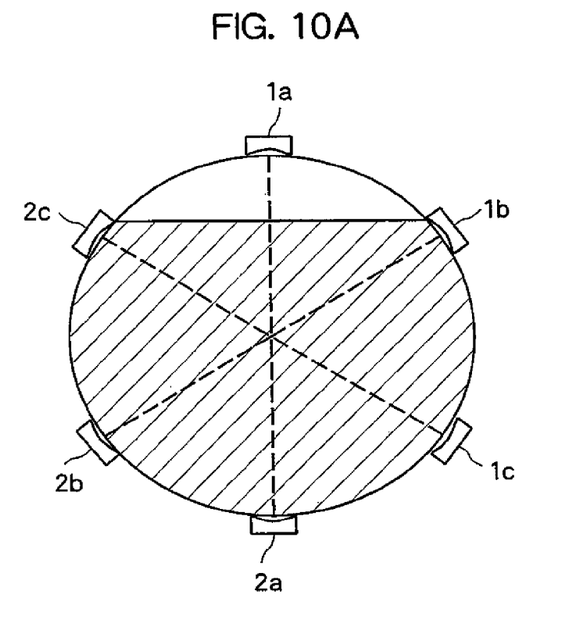
FIG. 10A is an explanatory diagram showing a state in which the information provision system according to an aspect of the embodiment is laid horizontally.
Figure 10B:
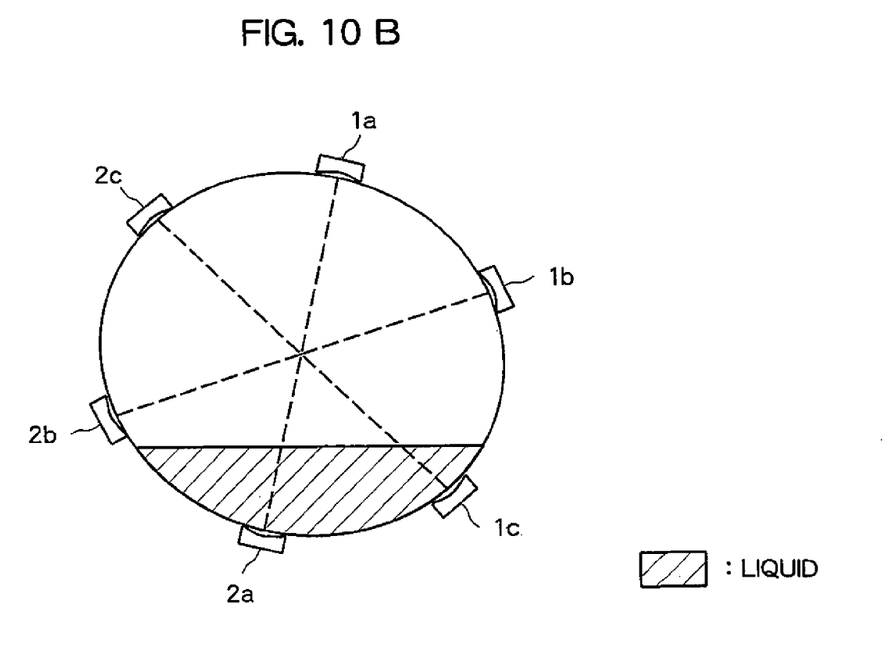
FIG. 10B is an explanatory diagram showing a state in which the information provision system according to an aspect of the embodiment is horizontally.

On the other hand, when the container is laid horizontally and the beverage is not consumed, the reception-signal intensities of two sets 10 (the set of 1b and 2b and the set of 1c and 2c) come to the value MIN for an unopened state, and the other set (the set of 1a and 2a) comes to a value slightly higher than the value MIN (the attenuation has decreased by the amount of air layer A) as shown in FIG. 10A. When more than half of the beverage is consumed, the reception-signal intensity of one set 10 (the set of 1b and 2b) comes to the value MAX, and the reception-signal intensities of the other two sets (the set of 1a and 2a and the set of 1c and 2c) come to a value slightly lower than the value MAX (the attenuation has increased by the amount of the beverage) as shown in FIG. 10B.

In this example, the controller 3 determines whether the container is placed vertically or horizontally depending on the reception-signal intensities of the sets 10. Specifically, when it is placed vertically, the reception-signal intensities of the sets 10 comes to one of approximate MIN and approximate MAX; when it is laid horizontally, the reception-signal intensity of at least one set 10 comes to the medium value between MIN and MAX. Thus, when the reception-signal intensity of any one of the sets 10 is neither approximate MIN nor approximate MAX (e.g., not a value within a specified range from MIN and MAX), the controller 3 determines that the container is laid horizontally.

When the controller 3 determines that the container is placed vertically, it generates remaining-amount information on the basis of the number of sets 10 having a reception-signal intensity of MIN, and outputs it to the transmission device 4.

When the controller 3 determines that the container is laid horizontally, it selects the largest of the reception-signal intensities output from the sets 10, estimates the remaining amount by comparing the maximum value with the value MAX in an empty state and the value MIN in an unopened state, generates information indicative of the remaining amount (remaining-amount information), and outputs it to the transmission device 4.

In this information provision system of this embodiment, when a container with this information provision system of the embodiment is housed in, e.g., a refrigerator, the refrigerator transmits a measurement instruction signal from the refrigerator according to an instruction from a user. Then, the information provision system detects the information on the remaining amount of the beverage or liquid food (e.g., curry roux) in the container, and transmits the information. The information is read by the information provision system affixed to, e.g., the refrigerator, and distributed to a user's mobile phone or the like, via network.

Figure 11:
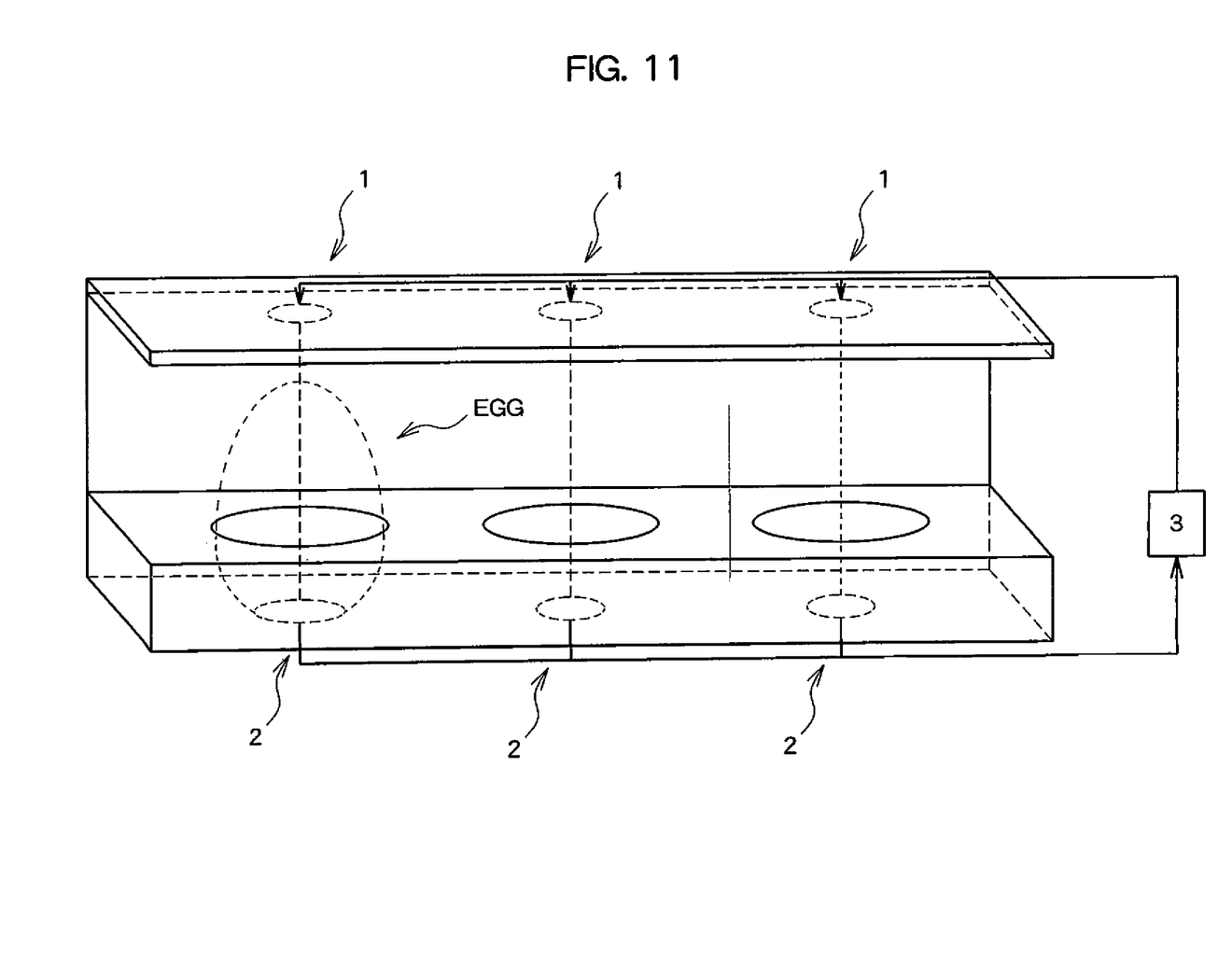
FIG. 11 is a schematic diagram of a structural example of an information provision system according to another aspect of the embodiment.

An information provision system according to another aspect of the invention will be described. The information provision system includes at least one set of the transmitter 1 and the receiver 2, which are opposed with the storage space for object beverage or food therebetween in a refrigerator. As shown in FIG. 11 as an example, the transmitter 1 is disposed on the top of each egg space, and the receiver 2 is disposed on the bottom of each egg space.

This information provision system includes a controller 3 connected to the transmitter 1 and the receiver 2. When receiving the input of an external measurement-instruction signal, the controller 3 radiates electromagnetic waves with a specified frequency from the transmitter 1 to the receiver 2. The frequency of the electromagnetic waves is set in a frequency band in which, e.g., water attenuation is relatively high, specifically, at a frequency of about 2.4 GHz for use in microwave ovens and so on.

The controller 3 measures the signal intensity of the electromagnetic waves received by the receiver 2. The controller 3 stores a signal intensity MAX when there is no object (beverage or food) and a signal intensity MIN when there is an object. Since the electromagnetic waves received are absorbed by the moisture interposed between the transmitter 1 and the receiver 2 to attenuate, the signal intensity is relatively low when there is beverage or food therebetween. The controller 3 determines whether or not there is beverage or food depending on the degree of the measured signal intensity relative to the value MAX when there is no object and the value MIN when there is an object, generates information indicative of the determination result (remaining-amount information), and outputs it. The output is distributed to a user's mobile phone or the like via, e.g., a network.

The embodiment uses that the attenuation differs between when there is an egg in the egg space and when there is another object such as tube wasabi. In other words, the controller 3 compares the signal intensity MIN when there is an object (e.g., an egg) with the reception-signal intensities received by the receivers 2. When the difference is smaller than a predetermined threshold, the controller 3 determines that there is an egg; when the difference is larger than the predetermined threshold, it determines that there is an object other than the egg or no object.

The controller 3 may count the number of the receivers 2 that are outputting the value of the reception-signal intensity by which there is an egg, and distribute the count result as the number of eggs.

The information provision system allows the management of the remaining amount of beverage and so on, and the measurement of the remaining amount even when a sealed bottle is laid horizontally or an object other than an egg (e.g., tube wasabi) is placed in an egg space, increasing availability.

While the present invention is described in terms of preferred or exemplary embodiments, it is not limited hereto.

What is claimed is:

1. An information provision system comprising:
    at least one transmitter-receiver set including a transmitter and a receiver opposed with an object to be measured therebetween; and
    a transmission device that estimates an amount of the object based on the attenuation of electromagnetic waves that the transmitter-receiver set transfers between the transmitter and the receiver, the attenuation of the waves occurring while being transmitted between the transmitter and receiver, and transmits the information on the estimated amount of the object to be measured.

2. The information provision system according to claim 1 affixed to a container that contains the object to be measured.

3. The information provision system according to claim 1, comprising
    a plurality of transmitter-receiver sets, wherein
    at least one of the transmitter-receiver sets is disposed such that a first line connecting the transmitter and the receiver thereof crosses a second line connecting the transmitter and the receiver of a second transmitter-receiver set.

4. An information provision system comprising:
    at least one transmitter-receiver set including a transmitter and a receiver opposed with a space for an object to be measured therebetween; and
    a controller that determines whether or not the object to be measured is placed on the space on the basis of the attenuation of electromagnetic waves that the transmitter-receiver set transfers between the transmitter and the receiver thereof, the attenuation of the waves occurring while being transmitted between the transmitter and receiver, and outputs the information on the determination result.

* * * * *